United States Patent [19]

Ohm

[11] 4,228,059
[45] Oct. 14, 1980

[54] WIRE ENAMEL

[75] Inventor: Klaus Ohm, Nettetal, Fed. Rep. of Germany

[73] Assignee: Chemische Fabrik Dr. Wiedeking, Kempen, Fed. Rep. of Germany

[21] Appl. No.: 52,583

[22] Filed: Jun. 27, 1979

Related U.S. Application Data

[63] Continuation of Ser. No. 851,831, Nov. 16, 1977, abandoned, which is a continuation-in-part of Ser. No. 686,909, May 17, 1976, abandoned.

[30]     Foreign Application Priority Data

May 21, 1975 [DE]  Fed. Rep. of Germany ........ 2522386
Sep. 19, 1975 [DE]  Fed. Rep. of Germany ....... 2541819

[51] Int. Cl.$^2$ .......................... C08K 5/06; C08K 5/07; C08K 5/10; C08K 5/17
[52] U.S. Cl. .............................. 260/30.2; 260/31.4 R; 260/32.4; 260/32.6 N; 260/32.8 N; 260/33.2 R; 528/281
[58] Field of Search ................ 260/30.2, 31.4 R, 32.4, 260/32.6 N, 32.8 N, 33.2 R

[56]           References Cited
        U.S. PATENT DOCUMENTS 3,426,098  2/1969  Meyer et al. ......................... 260/841
3,852,246  12/1974  Schmidt et al. ................... 260/75 N

FOREIGN PATENT DOCUMENTS 973377  10/1964  United Kingdom .

*Primary Examiner*—Stanford M. Levin
*Attorney, Agent, or Firm*—Toren, McGeady and Stanger

[57]            ABSTRACT

Polyester-polyimide resins having a hydroxyl value of 150 to 600 and containing repeating units derived from tris-(2-hydroxyethyl) isocyanurate or tris-(2-carboxyethyl) isocyanurate are known valuable film-forming agents in wire enamels. Enamels of low viscosity at high solids content can be prepared by dissolving the resins in solvent systems free from phenols and containing at least 30% (wt.) diacetylacetone, monoalkylesters of ethylene glycol, diethylene glycol and the like, and lower alkanoic acid esters of the ethers, and these solvent components are less irritating and partly less toxic than solvents employed heretofore.

9 Claims, No Drawings

WIRE ENAMEL

This is a continuation of application Ser. No. 851,831, filed Nov. 16, 1977, which, in turn, is a continuation-in-part of application Ser. No. 686,909, filed May 17, 1976, both now abandoned.

This invention relates to wire enamels based on polyesterpolyimide resins, and particularly to improved enamels containing solvent systems not employed heretofore.

Wire enamels based on polyester-polyimide resins, such as those disclosed in British Pat. No. 973,377 or U.S. Pat. No. 3,426,098, have found wide acceptance because of their high mechanical and dielectric strength and their good thermal stability. They adhere well to the commonly employed copper and aluminum conductors.

It is a disadvantage of these resins that they do not dissolve adequately in the common, inexpensive solvents, and the enamels had to be prepared heretofore from solvent systems whose ingredients are costly and/or toxic and/or irritating to humans. The solvent systems commonly used prior to this invention consisted mainly of nitrogen-bearing solvents, such as dimethylformamide, dimethylacetamide, N-methylpyrrolidone, and particularly of hydroxybenzenes such as phenol, cresol, and xylenol. Attempts have been made to avoid the solvents by coating wires with the resins in the molten condition, but the molten coatings can be applied only at relatively low wire speeds, and it is difficult to produce thin coatings on thin wires in this manner.

It has now been found that polyester-polyimide resins in which at least 20% of the weight of the alcohol component consists of tris-(2-hydroxyethyl)isocyanurate or tris-(2-carboxyethyl)isocyanurate, which have hydroxyl values of 150 to 600, and are suitable for insulating wire coatings having the aforementioned desirable properties can be dissolved in relatively small amounts of solvent if the solvent system contains 30% to 100% by weight diacetone alcohol, monoalkyl ethers of the formula $C_nH_{2n+1}$—[O—$CH_2$—$CH_2$]$_m$—OH or esters of these ethers with alkanoic acids having carbon chains of up to four members if n and m in the formula are integers, n being 1 to 4, and m being 1 or 2, even though the remainder of the solvent system, if any, consists essentially of compounds free from phenolic hydroxyl groups.

Solvent system components which are preferred at this time because of their desirable properties and/or cost and availability include the monomethyl ether of ethylene glycol and the corresponding ethyl, propyl, and butyl ether, and the esters of these ethers with formic, acetic, propionic, and butyric acid such as Cellosolve acetate and methyl Cellosolve acetate. The most advantageous combination of solvent properties has been found so far in the monomethyl and monoethyl ethers of diethylene glycol and the esters thereof.

The afore-mentioned solvents may be diluted up to 40% of the total solvent weight with inexpensive other solvents, such as aliphatic or aromatic hydrocarbons, butanol, and the like, as long as the ethers, esters, and/or diacetone alcohol amount to at least 30% of the solvent system. It is rarely necessary though sometimes convenient to employ more than 80% of these relatively costly components.

The solubility of the polyester-polyimide resins in solvent systems containing some of the afore-mentioned ingredients can be improved by small admixtures of nitrogen-bearing compounds such as dimethylformamide, dimethylacetamide, N-methylpyrrolidone, triethylamine, monoethanolamine, ethylenediamine, ammonia, and hydrazine. As little as 0.1% by weight of the nitrogenous agents can produce a distinct improvement in solubility, but they are irritants, and inconvenient to use in amounts greater than 30%, based on the total solvent weight, without contributing further improvement.

The resins having repeating units derived from tris-(2-hydroxyethyl) or tris-(2-carboxyethyl)isocyanurate and high hydroxyl values which constitute particularly good enamels with the solvents of the invention are fully known from the aforementioned U.S. Pat. No. 3,426,098 and do not require further description. Best results in wire coating are usually achieved if the hydroxyl value is in the range between 200 and 450, as determined by German Industrial Standard DIN Norm 53240. Solutions of these resins containing 30% to 80% resin by weight are readily prepared and are distinguished by much lower viscosity than solutions of the same resins in the best solvents known heretofore, which are phenols.

The relatively high boiling point and low volatility at ambient temperature which characterizes the monoalkyl ethers of diethylene glycol makes them convenient to use. Moreover, their solvent effects, when used as the sole relevant ingredients of a solvent system, are as good as those achieved with the ethers of ethylene glycol only in the presence of nitrogenous addition agents. Diethylene glycol ethers and their derivatives are particularly good solvents for polyester-polyimide resins which contain diethylene glycol or triethylene glycol as repeating alcohol units in the polyester moieties of the resins, preferably amounting to ⅓ to ⅔ of the total weight of alcohol units.

The enamels of the invention may contain the conventional minor addition agents, such as butyl titanate, zinc acetate, phenolic resins, and stabilized isocyanates without unfavorable effects on the solvent system. The composition of the resin is not in itself critical, but the units derived from tris-(2-hydroxyethyl) isocyanurate and tris-(2-carboxyethyl) isocyanurate should amount to 5% to 40% of the total weight of the resin. The nitrogenous compounds which enhance dissolution of the resins when incorporated in the solvent system have a similar effect when incorporated in the resin itself by condensation.

The following Examples for further illustrative of this invention. All parts are by weight unless stated otherwise.

EXAMPLE 1

A polyester-polyimide resin was prepared by condensing the following ingredients in a conventional manner at a temperature rising to 240° C.:
750 parts ethylene glycol
5 parts zinc acetate
1000 parts tris-(2-hydroxyethyl) isocyanurate
650 parts dimethyl terephthalate
1550 parts trimellitic anhydride
770 parts diaminophenylmethane
The resin was hard and brittle and had a hydroxyl value of 300.

An enamel suitable for covering copper conductors as an insulating coating was prepared by dissolving 70 parts resin at about 100° C. in a mixture of 90 parts diacetone alcohol and 10 parts N-methylpyrrolidone and adding 2 parts cresyl titanate to the solution.

EXAMPLE 2

Good wire coating enamels were similarly prepared from 100 parts of the resin obtained by the method of Example 1 and the following solvent systems:

(a)

20 parts dimethylformamide
50 parts ethylene glycol monomethyl ether acetate
30 parts xylene
2 parts cresyl titanate (b)

10 parts N-methylpyrrolidone
50 parts ethylene glycol monoethyl ether acetate
40 parts xylene
2 parts butyl titanate (c)

5 parts monoethanolamine
30 parts ethylene glycol monoethyl ether
30 parts diacetone alcohol
15 parts butanol
20 parts xylene
4 parts acetylacetone titanate (d)

100 parts ethylene glycol monomethyl ether acetate
2 parts butyl titanate (e)

20 parts diacetone alcohol
20 parts ethylene glycol monomethyl ether
20 parts Butoxyl (butylene glycol monomethyl ether acetate)
20 parts n-butanol
20 parts xylene
5 parts triethanolamine titanate The enamels (a), (b), (d) which contained equal amounts of resin and solvent, and in which the solvent consisted of at least 50% glycol ether or glycol ether acetate, had viscosities of 60, 80, and 50 seconds respectively, as determined by German Industrial Standard DIN 53211 with a 4 mm nozzle at 20° C.

By way of example, a wire enamel was prepared from 50 parts of the resin obtained in Example 1, 80 parts cresol, and 20 parts xylene. After addition of 2 parts butyl titanate, the enamel had a viscosity of 90 seconds DIN although it contained only 33% resin solids based on the combined weight of resin and solvent.

EXAMPLE 3

Another polyester-polyimide resin was prepared at a maximum temperature of approximately 210° C. from the following reactants:
1200 parts ethylene glycol
6 parts zinc acetate
1000 parts tris-(2-hydroxyethyl) isocyanurate
645 parts dimethyl terephthalate
1550 parts trimellitic acid
800 parts diaminodiphenylmethane
The resin was hard and had a hydroxyl value of 450.

A wire enamel was prepared by dissolving 80 parts of the resin in a mixture of 20 parts diacetone alcohol, 20 parts ethylene glycol monomethyl ether, 20 parts Butoxyl, 20 parts butanol, and 20 parts xylene, and adding 5 parts triethanolamine titanate.

EXAMPLE 4

600 Parts glycol
200 parts glycerol
320 parts diethylene glycol
645 parts dimethyl terephthalate
5 parts zinc acetate
1008 parts tris-(2-hydroxyethyl) isocyanurate
1548 parts trimellitic anhydride
768 parts diaminodiphenylmethane
were condensed in the usual manner at a maximum temperature of approximately 240° C. Upon cooling, there was obtained a hard polyester-polyimide resin having a hydroxyl value of approximately 330.

A wire enamel was prepared by dissolving 50 parts of the resin at approximately 100° C. in 50 parts diethylene glycol monomethyl ether and adding one part butyl titanate. The enamel had a viscosity of 100 seconds DIN.

EXAMPLE 5

A hard polyester-polyimide resin having a hydroxyl value of approximately 330 was prepared by condensing at a temperature rising to 230° C.
300 parts glycol
300 parts glycerol
800 parts diethylene glycol
550 parts isophthalic acid
5 parts zinc acetate
1008 parts tris-(2-hydroxyethyl) isocyanurate
1548 parts trimellitic anhydride
768 parts diaminodiphenylmethane.

A good wire enamel was prepared by dissolving 50 parts of the resin in 50 parts diethylene glycol monoethyl ether and one part butyl titanate.

EXAMPLE 6

A hard polyester-polyimide resin was obtained by condensation up to 230° C. of:
400 parts glycol
500 parts glycerol
800 parts diethylene glycol
550 parts isophthalic acid
5 parts zinc acetate
1500 parts trimellitic anhydride
750 parts diaminodiphenylmethane.

The resin had a hydroxyl value of about 350, and a wire enamel was prepared therefrom by dissolving 50 parts in a mixture of 30 parts diethylene glycol monomethyl ether and 20 parts diethylene glycol monobutyl ether acetate, and adding 1 part butyl titanate to the solution. The enamel had a viscosity of 80 seconds DIN.

While the inventon has been described with particular reference to specific embodiments, it is to be understood that it is not limited thereto, but is to be construed broadly and restricted solely by the scope of the appended claims.

What is claimed is:
1. In a wire enamel consisting essentially of a polyesterpolyimide resin and a solvent system containing said resin as a solute, the resin having a hydroxyl value of 150 to 600, and at least 20% by weight of the alcohol component of said resin consisting of tris-(2-hydrox- yethyl) isocyanurate, the improvement in the solvent system which comprises:

(a) 30% to 100% of the weight of said solvent system consisting of at least one member of the group consisting of diacetone alcohol, monoalkyl ethers of the formula $C_nH_{2n+1}-(O-CH_2-CH_2)_m-OH$, and alkanoic acid esters of said ethers,
  (1) in said formula, n and m being integers, n being 1 to 4, and m being 1 or 2, and
  (2) said alkanoic acid having a carbon chain of not more than four members; and
(b) the remainder of said solvent system essentially consisting of compounds free from phenolic hydroxyl groups when said at least one member is less than 100%.

2. In an enamel as set forth in claim 1, said remainder including 0 to 30% by weight of at least one nitrogen-bearing compound selected from the group consisting of dimethylformamide, dimethylacetamide, N-methylpyrrolidone, triethylamine, monoethanolamine, ethylenediamine, ammonia, and hydrazine.

3. In an enamel as set forth in claim 2, said remainder essentially consisting of said nitrogen-bearing compound and 0 to 40% by weight of a liquid organic solvent as a diluent.

4. In an enamel as set forth in claim 3, said organic solvent being a member of the group consisting of aliphatic and aromatic hydrocarbons and butanol.

5. In an enamel as set forth in claim 1, said at least one member being a monoalkyl ether or an alkanoic acid ester of said monoalkyl ether, n being 1 or 2.

6. In an enamel as set forth in claim 1, said at least one member not exceeding 80% of said solvent system.

7. In an enamel as set forth in claim 1, said resin amounting to 20% to 80% of said enamel.

8. In an enamel as set forth in claim 1, diethylene glycol or triethylene glycol constituting ½ to 170 of the weight of alcohol components of said resin, said at least one member being a monoalkyl ether of diethylene glycol or an ester thereof.

9. In an enamel as set forth in claim 1, 5% to 40$ of the total weight of sad resin consisting of repeating units containing said tris-(2-hydroxyethyl) isocyanurate as the alcohol component.

* * * * *